United States Patent [19]

Watson

[11] Patent Number: 4,605,985

[45] Date of Patent: Aug. 12, 1986

[54] SENSOR ARRAY

[75] Inventor: Jeremy D. M. Watson, Burgess Hill, England

[73] Assignee: Emi Limited, Hayes, England

[21] Appl. No.: 773,134

[22] Filed: Sep. 6, 1985

[30] Foreign Application Priority Data

Sep. 14, 1984 [GB] United Kingdom ................. 8423315

[51] Int. Cl.$^4$ ......................... H01G 7/00; H01G 5/01
[52] U.S. Cl. ..................................... 361/283; 361/278
[58] Field of Search ............... 361/277, 278, 280, 283, 361/287, 288, 291, 292

[56] References Cited

U.S. PATENT DOCUMENTS

| | | | |
|---|---|---|---|
| 1,441,212 | 1/1923 | Cardwell | 361/278 X |
| 2,639,315 | 5/1953 | Gutterman | 361/278 |
| 2,758,268 | 8/1956 | Peyssov | 361/278 X |
| 4,320,766 | 3/1982 | Alihanka et al. | 361/283 X |
| 4,439,647 | 3/1984 | Calandrello et al. | 361/288 X |

Primary Examiner—Donald A. Griffin
Attorney, Agent, or Firm—Fleit, Jacobson, Cohn & Price

[57] ABSTRACT

A sensor array includes a number of discrete elements each comprising a dielectric body and two electrodes. Dielectric body has an annular skirt and the electrodes define an annular gap in which an end portion of the skirt is located. Body is displaced relative to the electrodes upon application of pressure thereto, causing the skirt to further penetrate the gap and cause a detectable change in capacitance of the electrodes, related to the magnitude of the applied pressure. The dielectric bodies are supported by a common, resilient sheet which returns the bodies to a rest position when pressure is removed.

6 Claims, 4 Drawing Figures

SENSOR ARRAY

The present invention relates to a sensor array particularly, but not solely, for use in programmable manipulators.

The present invention provides a sensor array comprising: a plurality of sensor elements, each element having electrodes and a dielectric body which are relatively movable, from a rest position upon application of pressure to the element, such that the increase in penetration of the body between the electodes is proportional to the amount of pressure applied; and a common resilient support connected to the elements thereby to return the electrodes or body of any of those elements to the rest position when pressure is removed from that element.

Preferably the resilient support comprises a sheet of resilient material having a plurality of apertures, each of the elements extending through a respective aperture in the resilient support and being secured to the support along the periphery of the respective aperture. Alternatively the resilient support comprises a continuous sheet of resilient material which is secured, on its surface facing inwardly of the array, to each of the elements forming the array.

Accordingly, the resilient sheet (whether apertured or not) may provide support and compliance to the movable member (whether the electrodes or the dielectric body) of the sensor elements forming the array. Also the resilient sheet can be readily arranged to act as a seal for the array whereby its interior is protected from contamination. Moreover the resilient sheet can be readily and economically manufactured; the sensor array incorporating the resilient sheet is of a simple construction which enables easy assembly.

The resilient support may comprise a top sheet with one or more projections extending inwardly of the array between adjacent elements in the array. For example, the top sheet may have two mutually perpendicular and intersecting groups of walls extending inwardly of the array thereby to form a separate compartment for each of the elements, the walls in each group being parallel to one another. While these provisions may involve more complex manufacturing techiques when forming the resilient support, they ensure further simplification of the array's assembly procedure.

In one preferred form of sensor element for use in the present invention, each sensor element has: two electrodes fixed to an insulating backing common to the elements; and a dielectric body which is connected to the common resilient support and which is movable to increase penetration between the electrodes in proportion to the pressure applied to that element. One further advantageous feature of this form is that the resilient support and at least one dielectric body may be integrally preformed as a single piece (for example by moulding), in order to further simplify the construction of array and its assembly.

The sensor elements in the array of the present invention may be located on a substrate (for example a printed circuit board) which incorporates the electronic circuitry necessary to process any signals output from the sensor elements.

An array embodying the present invention may incorporate any suitable means for determinimg the change in electrical properties of a sensor element upon a change in penetration of the respective body between the electrodes of that element. An array embodying the present invention may also have any suitable means for processing the outputs from the sensor elements for combination into a readily-usable form.

The present invention enables a sensor array to incorporate any one or more of the following benefits: effective immunity of the array from contamination by the environment; ease of manufacture of the components forming the array; ease of assembly of the array; elimination of moving electrical conductors; the facility for miniaturisation; applicability over a wide range of resolutions; the facility for matrix scanning by relatively simple electronic hardware.

In order that the invention may be more readily be understood, a description is now given, by way of example only, reference being made to the accompanying drawings, in which.

Figure 1:
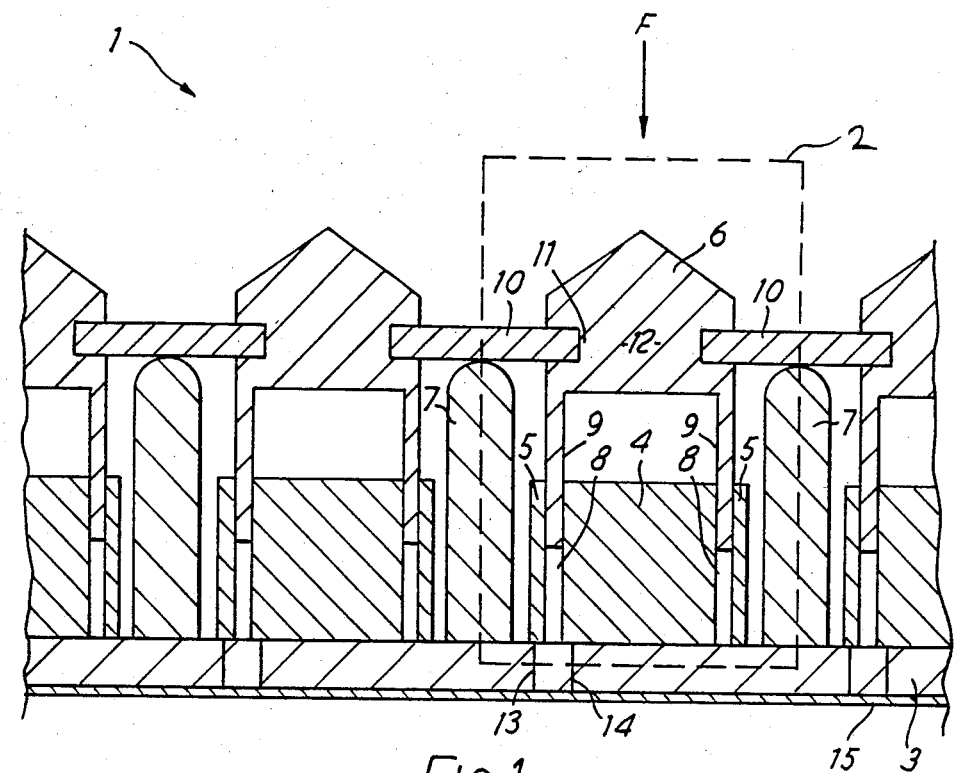
FIG. 1 is a cross-sectional view of part of a sensor array embodying the present invention.

A sensor array 1, part of which is shown in FIG. 1, is formed of a regular matrix of sensor elements 2 (only one being referenced in the Figure) attached to one surface of a printed circuit board. Each sensor element 2 has two electrodes 4, 5 and a dielectric body 6, the boundary of each element 2 within the matrix being defined by two groups of mutually-perpendicular and intersecting walls 7 which form distinct compartments of square cross-section for elements 2. The electrodes 4 and 5 are fixed to printed circuit board 3 in such an arrangement that there exists an annular gap 8 between the electrodes of a size to accommodate a lower skirt 9 of dielectric body 6. An elastomer sheet 10 has a number of apertures 11, each of which accommodates securely a narrowed waist 12 of one of the dielectric bodies 6 in the element matrix; the interengagement between the periphery of an aperture 11 and a waist 12 is sufficiently strong for there to be effective sealing at these interfaces against the ingress of moisture or small particles at pressures normally encountered in industrial environments. The grid formed of the walls 7 acts to buttress sheet 10 within the array.

Sheet 10 supports dielectric body 6 when no force is being applied to the respective element 2. When a force F is applied to element 2, dielectric body 6 is urged downwardly against the biassing forces due to resilience of sheet 10, the resultant displacement causing skirt 9 to further penetrate electrode gap 8. This action increases the capacitance of the electrode gap 8 and thereby produces a readily-detectable consequent change in the electrical characteristics of electrodes 4 and 5. As soon as force F is removed, sheet 10 applies a restoring force on dielectric body 6 whereby it is urged to return to its original position, i.e. that position which it held before force F was applied.

Each of electrodes 4 and 5 is electrically connected, via conductors 13 and 14 respectively, to circuitry 15 on the other side of printed circuit board 3; circuitry 15 processes the electrical outputs from all of the elements 2 forming the matrix.

Figure 3:
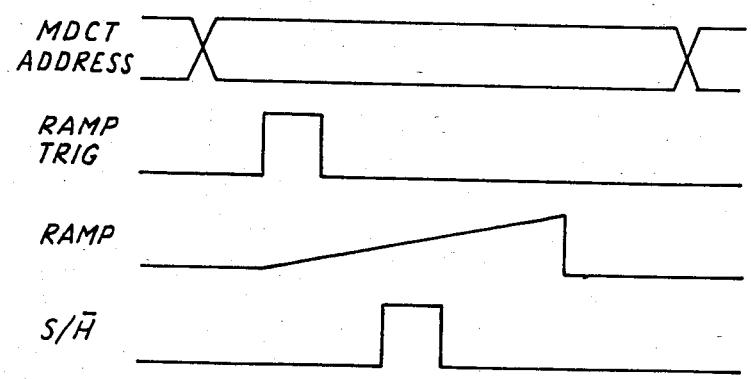
FIG. 3 is a diagram of the signals appropriate to the system of FIG. 2.

Circuitry 15 measures the capacitance of the element 2 by using a two-dimensional matrix scanning technique which ensures minimisation of the number of sensing circuits required. The technique utilizes a FET switch 20 for each element 2, with multiplexed excitation signals to allow well-isolated element selection; column current is sensed by current amplifiers which feed on analogue multiplexer 21. This provides a selected column signal to a sample/hold circuit. The ramp excitation is switched to the same row as the currently selected 'enable' FETs. The system is intended to operate under microcomputer control, and FIG. 3 shows the timing relationship between relevant signals. A cell address is first set up; this opens an excitation path to one row of the array, and switches 'on' the enable FETs in that row. The column address field selects the current amplifier output to be fed to the sample/hold circuit, where its level is stored prior to digitisation (the A to D sub-system is not shown). After a delay during which transients are allowed to decay, the excitation (ramp) generator is triggered. This provides a voltage signal with constant dV/dt to the selected row. The induced column current is transduced to a voltage signal and sampled after a further 'settling' delay. This is subsequently acquired and logged by the microcomputer.

Thus, an analogue multiplexer drives the row lines which, in addition, are made of low 'off' impedance by the deployment of 'pull-down' resistors to shunt any excitation signal fed through the 'off' capacitance of the multiplexer. Cell-enabling FETs are chosen for low gate-body leakage and low inter-electrode capacitance to further reduce interaction.

The circuitry 15 could deliver output data to a robot controller in a hierarchy of processed forms including:

(i) A stream of bytes each describing the displacement of an element 2 in the array;

(ii) The above data after various levels of 'retinal' processing, i.e. Thresholding, Spacial filtering, Edge detection, Primitive shape recognition.

Processing software of the outputs could include auto-zeroing routines to compensate for thermal drift and mechanical offset effects and could also offer error reporting on faulty elements and the vetoing of data from obviously faulty tranducers, thereby giving a 'soft failure' characteristic.

The circuitry may monitor the state of the elements at predetermined time intervals, and can use this information to determine a static enhanced-resolution image.

Figure 4:
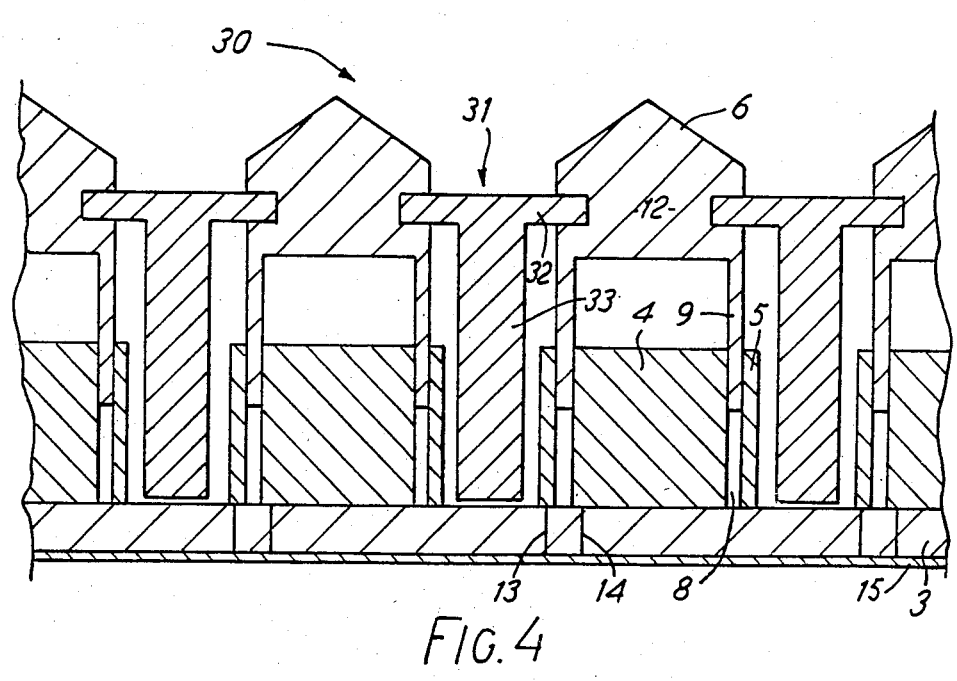
FIG. 4 is a cross-sectional view of part of another sensor array embodying the present invention.
Figure 2:
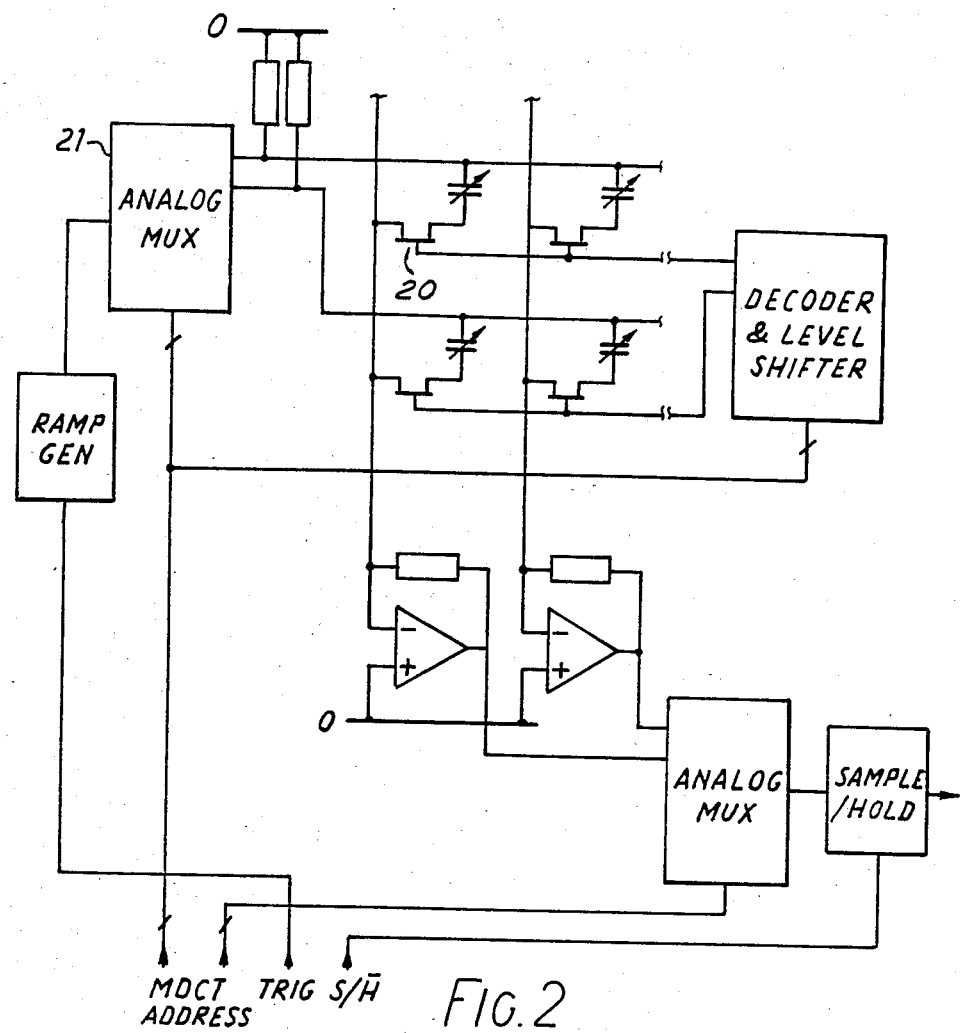
FIG. 2 is a block schematic diagram of the matrix-scanning system for the sensor array of FIG. 1.

The sensor array 30 shown in FIG. 4 is basically the same as array 1 in construction and operation, except that there is now a resilient support 31 formed of a sheet 32 with integral inwardly-projecting walls 33. Thus this support 31 forms the separate compartments for the sensor elements and buttresses the sheet against the printed circuit board 3; the support 31 replaces the sheet 10 and the various walls 7, thereby providing easier assembly of the array.

The dielectric body 6 may be of any appropriate material, for example polypropylene, PVC, unpoled PVDF. Moreover it may be manufactured in any appropriate manner, for example injection moulding, press moulding or machining.

Either of the arrays described above can be modified such that the dielectric body is formed integrally with the resilient sheet, and where appropriate the walls, as a single piece. One suitable material for this purpose is PVC.

In another modification to the described arrays, the sensor elements are arranged in a staggered relationship with a matrix, and not in a square or rectangular format; thus for example consecutive rows of elements are staggered rather than lying on a rectangular grid. This layout may be particularly beneficial when used in applications involving conveyors in industrial situations, because by using information on the conveyor motion a "vernier" effect can be obtained through which long-axis resolution can be quadrupled.

The described constructions of sensor array are readily capable of fabrication by hybrid and/or VLSI techniques.

I claim:

1. A sensor array comprising: a plurality of sensor elements, each element having electrodes and a dielectric body which are relatively movable, from a rest position upon application of pressure to the element, such that the increase in penetration of the body between the electrodes is proportional to the amount of pressure applied; and a common resilient support connected to the elements thereby to return the electrodes or body of each of those elements to the rest position when pressure is removed from that element.

2. A sensor array according to claim 1, wherein the resilient support comprises a sheet of resilient material having a plurality of apertures, and each of the elements extends through a respective aperture in the resilient support and is secured to the support along the periphery of the respective aperture.

3. A sensor array according to claim 1, wherein the resilient support comprises a top sheet with one or more projections extending inwardly of the array between adjacent elements in the array.

4. A sensor array according to claim 3, wherein the top sheet has two mutually-perpendicular and intersecting groups of walls extending inwardly of the array thereby to form a separate compartment for each of the elements, the walls in each group being parallel to one another.

5. A sensor array according to claim 1, wherein each of the sensor elements comprises two electrodes fixed to an insulating backing common to the elements, and a dielectric body which is connected to the common resilient support and which is movable to increase penetration between the electrodes in proportion to the pressure applied to that element.

6. A sensor array according to claim 1, wherein the common resilient support and at least one dielectric body are integrally preformed.

* * * * *